United States Patent [19]

Takahashi

[11] Patent Number: 5,310,391
[45] Date of Patent: May 10, 1994

[54] COMPOUND PLANETARY GEAR TRANSMISSION HAVING LOAD EQUALIZATION MEANS

[76] Inventor: Takashi Takahashi, 26-18, Kamisoshigaya 1, Setagaya-ku, Tokyo, Japan

[21] Appl. No.: 883,515

[22] Filed: May 15, 1992

[30] Foreign Application Priority Data

May 23, 1991 [JP] Japan .................. 3-118649

[51] Int. Cl.⁵ ............................ F16H 1/28
[52] U.S. Cl. ................................ 475/338
[58] Field of Search ............ 475/334, 338, 341

[56] References Cited

U.S. PATENT DOCUMENTS

| | | | |
|---|---|---|---|
| 1,678,798 | 7/1928 | Asprooth et al. | 475/338 |
| 2,688,263 | 9/1954 | Rockwell | 475/338 |
| 2,944,444 | 7/1960 | Burns | 475/334 |
| 3,090,258 | 5/1963 | Zink et al. | 475/338 |
| 3,258,995 | 7/1966 | Bennett et al. | 475/334 X |
| 3,381,548 | 5/1968 | Wolkenstein | 475/338 |
| 3,527,121 | 9/1970 | Moore | 475/338 |

FOREIGN PATENT DOCUMENTS

| | | | |
|---|---|---|---|
| 59-1840 | 1/1984 | Japan | 475/338 |
| 1460474 | 2/1989 | U.S.S.R. | 475/334 |

*Primary Examiner*—Dirk Wright
*Attorney, Agent, or Firm*—Nikaido, Marmelstein, Murray & Oram

[57] ABSTRACT

A transmission comprising a planetary gear mechanism wherein a plurality of planetary gears 6 are provided around a sun gear and meshed with the sun gear 5 and an internal gear 7 is provided outside the planetary gears and meshed with the planetary gears 6. The internal gear 7 consists of two split internal gears 7a, 7b divided by a plane perpendicular to its axial direction. Each of the plurality of planetary gears 6 consists of a large planetary gear 6a having a large diameter and small planetary gears 6b having small diameters and coaxially spline-coupled to the large planetary gear 6a in such a manner that the tooth portions thereof are positioned both sides of the large planetary gear 6a. The split internal gears 7a, 7b are meshed with the teeth of each small planetary gear 6b. The sun gear 5 is meshed with the large planetary gear 6a. An intermediate idle ring 11 is provided to each of the planetary gears 6 as a mechanism for equally distributing the load.

3 Claims, 2 Drawing Sheets

COMPOUND PLANETARY GEAR TRANSMISSION HAVING LOAD EQUALIZATION MEANS

BACKGROUND OF THE INVENTION

This invention relates to a planetary gear transmission which provides a high change gear ratio, though its structure is compact.

As is known in the art, a transmission comprising a planetary gear mechanism can provide a greater change gear ratio while its structure is more compact than ordinary change gear transmissions. The greater the gear ratio of a planetary gear to a sun gear, that is, the greater the ratio of the diameter of the planetary gear to that of the sun gear, the greater becomes this change gear ratio.

However, since the planetary gear mechanism has a plurality of planetary gears disposed around the sun gear, the change gear ratio obtained from one particular planetary gear mechanism is limited to the extent such that the diameters of the plurality of planetary gears do not interfere with one another. Two or more sets of planetary gear mechanisms must be coupled to each other in an axial direction in order to obtain a greater change gear ratio. If two or more sets of planetary gear mechanisms are coupled to each other in an axial direction, however, the size of the overall device in the axial direction becomes large, and a larger installation space becomes necessary. For this reason, the cost of production of the transmission becomes unavoidably higher.

SUMMARY OF THE INVENTION

It is an object of the present invention to provide a transmission comprising a planetary gear mechanism which is capable of providing a large change gear ratio, while keeping its structure is compact.

It is another object of the present invention to provide a planetary gear transmission which can equally and smoothly distribute a load to a plurality of planetary gears disposed inside the transmission in order to obtain a high change gear ratio while keeping the structure of the transmission compact as described above.

In a planetary gear mechanism wherein a plurality of planetary gears around a sun gear are meshed with the sun gear and an internal gear outside the planetary gears is meshed with the planetary gears, a transmission for achieving the objects of the present invention has a structure wherein the internal gear comprises two internal ring gears split at a plane orthogonally crossing an axial direction, each of the planetary gears comprising a large planetary gear having a large diameter and small planetary gears having small diameters and which are spline-coupled coaxially to the large planetary gear so that the teeth of the small planetary gears are on both sides of the large planetary gear, each of the split internal ring gears is meshed with the teeth of each small planetary gear, and the sun gear is meshed with the large planetary gear. Furthermore, a load equally distributing the load is provided to each of the planetary gears.

Since each planetary gear set consists of a large planetary gear and small planetary gears, the sun gear is meshed with the large planetary gear and the internal gear is meshed with the small planetary gears as described above, a high change gear ratio can be obtained by the use of only a one-stage planetary gear mechanism. Since the two split internal ring gears mesh with the small planetary gears on both sides of the large planetary gear, bending and twist moments do not occur in the planetary shafts, and stable and smooth power transmission can be effected.

The planetary gear mechanism constituted as described above is of a locked train type wherein a plurality of planetary gears simultaneously mesh with the sun gear and with the internal gear. Therefore, smooth power transmission cannot be attained unless the large planetary gear and the small planetary gears having perfect coincidence of phases in their teeth are used. According to the present invention, however, the planetary gears each comprise a large planetary gear and small planetary gears that are spline-coupled coaxially with each other. Therefore, the same teeth and female splines for the large planetary gears can be machined simultaneously by putting a plurality of gear materials on each other. Since the internal gear has the split structure, the same gear shape can be made simultaneously by putting like-wise two gear blanks on each other. Accordingly, the present invention can easily solve the problem of phasing of teeth in the mechanism of locked drain type described above.

Furthermore, according to the present invention, each small planetary gear is turnably supported by a planetary shafts through an intermediate idle ring and the small planetary gear and the intermediate idle ring are allowed to co-rotate while a gap is interposed where an oil film can be formed between them. By this structure, the load from the sun gear can be distributed equally and smoothly to a plurality of planetary gears.

DETAILED DESCRIPTION OF THE PREFERRED EMBODIMENTS

Figure 1:
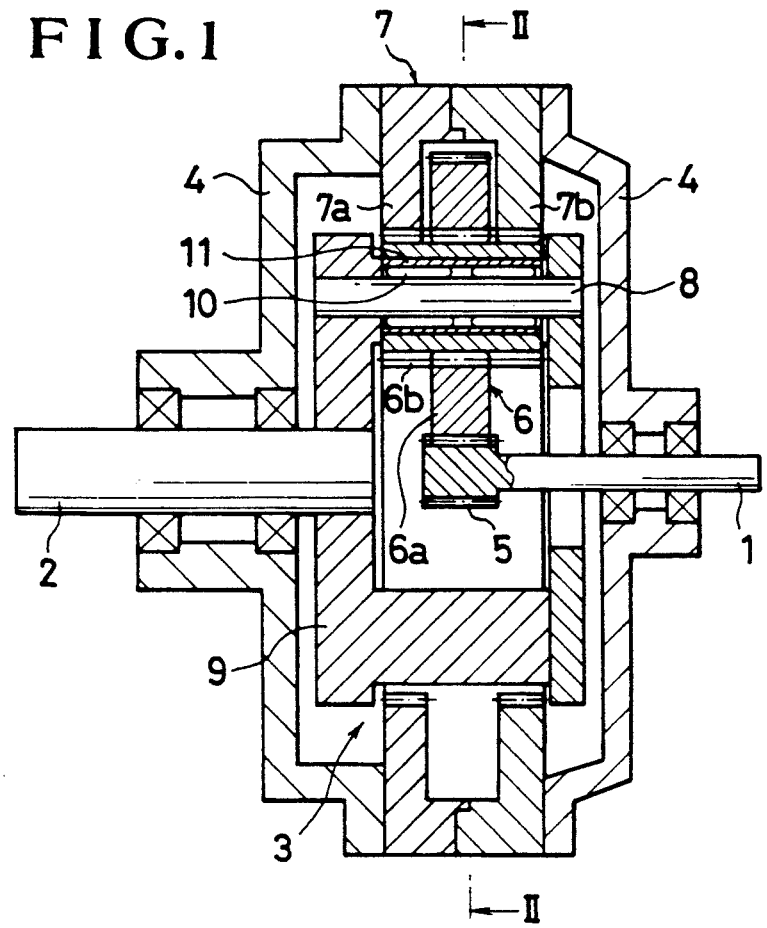
FIG. 1 is a longitudinal sectional view of a planetary gear transmission of an embodiment of the present invention.
Figure 2:
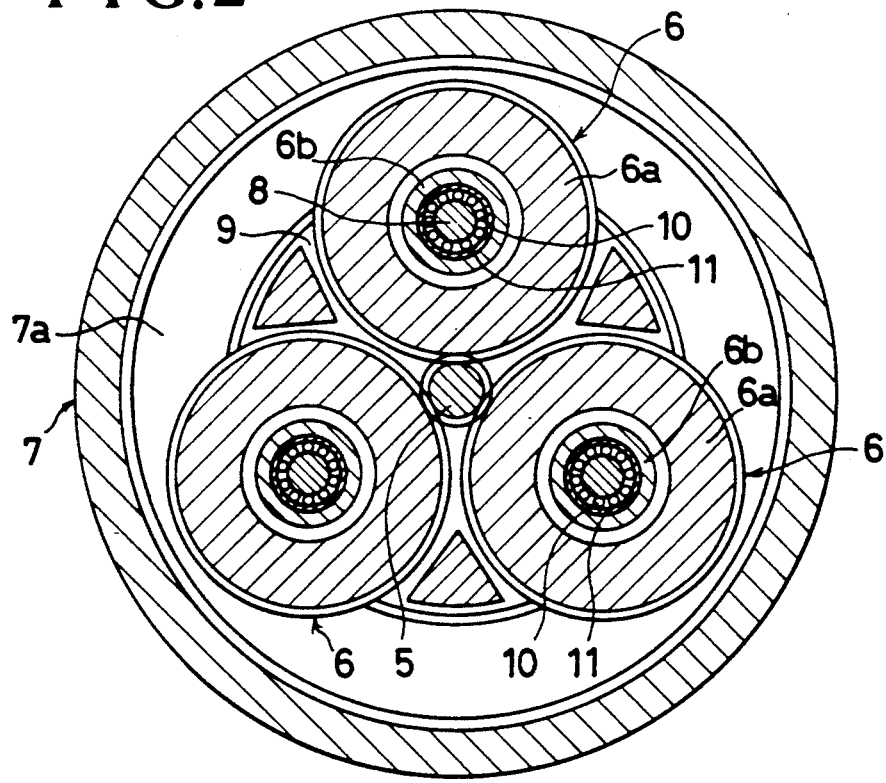
FIG. 2 is a sectional view taken along line II—II of FIG. 1.

FIGS. 1 and 2 show a planetary gear transmission of an embodiment of the present invention.

In FIGS. 1 and 2, reference numeral 1 denotes an input shaft, 2 is an output shaft, 3 is a planetary gear mechanism, and 4 is a casing. The planetary gear mechanism 3 comprises a sun gear 5 disposed integrally with the input shaft 1, a plurality of planetary gears (three gears being shown in the drawings) disposed around the sun gear 5, and an internal gear 7 meshing with the outside of these planetary gears 6. The planetary gears 6 are supported by a carrier 9 through planetary shafts 8. The carrier 9 is coupled to the output shaft 2.

The internal gear 7 consists of a split internal gear 7 split or divided back and forth by a plane perpendicular to an axial direction to form separate internal ring gears. These two front and rear separate internal ring gears 7a, 7b are sandwiched between the casings 4, 4 and are integrally coupled to each other by bolts and nuts not shown in the drawing. The planetary members 6 each comprise a combination of a large planetary gear 6a having a large diameter and small planetary gears 6b having smaller numbers of gear teeth and smaller diameters than the large planetary gear 6a. Each small planetary gear 6b coaxially fits on the shaft portion of the large planetary gear 6a through an involute spline, so that the gear tooth portions of the small planetary gear 6b are on both sides of the large planetary gear 6a in the axial direction due to this fitting.

In the planetary gears members 6 having the structure described above, the large planetary gears 6a mesh with the sun gear 5 while the small planetary gears 6b mesh with the two split internal gears 7a, 7b. Since the two ring internal gears 7a, 7b mesh with the small planetary gears 6b projecting on both sides of the large planetary gear 6a, binding and twist moments do not occur in the planetary shafts 8 and power can be transmitted stably.

In the planetary gear mechanism described above, the power inputted from the input shaft 1 to the sun gear 5 is reduced and transmitted to a plurality of large planetary gears 6a, further reduced by a plurality of small planetary gears 6b meshing with the split internal gears 7a, 7b, and transmitted to the output shaft 2. Since the planetary gears 6 each comprise the large planetary gear 6a having a large number of gear teeth and the small planetary gears 6b having small numbers of gear teeth, the change gear ratio (reduction ratio) can be made greater than in a conventional planetary gear mechanism comprising a planetary gear of a simple structure. Moreover, since this large change gear ratio can be attained by one stage planetary gear mechanism alone, the transmission can be made more compact and the installation space can be reduced.

The planetary gear mechanism described above is locked train. To effect smooth transmission of the power, therefore, the phases of the teeth of a plurality of sets of large planetary gears and small planetary gears must be in perfect conformity with one another. This coincidence of the phases of teeth can be accomplished easily by employing a structure of the planetary gear members 6 wherein the large planetary gears 6a and the small planetary gears 6b are spline-coupled coaxially and the internal gear 7 comprises the two split ring gears 7a, 7b divided by the plane orthogonal to the axial direction.

In other words, as to the large planetary gear members 6a of the planetary gears 6, female splines having the same phase can be machined simultaneously by putting a plurality of gear materials on each other. As to the internal gear 7, the tooth shapes having the same phase can be made simultaneously by putting two gear blanks on each other in a similar way. Accordingly, the phases of the teeth can be brought easily into conformity with one another by so disposing the two internal ring gears 7a, 7b thus machined as to be astride the large planetary gears 6b and by meshing them with the small planetary gears 6b spline-coupled to the shafts of the large planetary gears 6b and extending on both of the sides. In this way, the problem of the phasing of the teeth in the locked train described above can be solved easily.

Since the present invention employs the structure wherein the planetary gear members 6 each comprise the large planetary gear 6a and the small planetary gears 6b spline-coupled coaxially to the large planetary gear 6a, the transmission of the present invention makes it possible to adapt an idle intermediate idle ring 11, which will be later described, as a means for equally distributing the load to a plurality of planetary gears 6.

The change gear ratio of the transmission of the present invention which can attain such a high change gear ratio can be determined easily by the following calculation.

Assuming that the number of gear teeth of the sun gear 5 is $Z_1$, those of the large planetary gears 6a is $Z_2$, those of the small planetary gears 6b is $Z_3$, those of the internal gear 7 (internal ring gears 7a, 7b) is $Z_4$, the number of revolution of the sun gear is 1 and that of the output shaft 2 is zero; then, the number of revolution of each gear is shown in Table 1 below:

TABLE 1

| gear | number of teeth | number of revolution |
|---|---|---|
| sun gear (input shaft) | $Z_1$ | 1 |
| large planetary gears | $Z_2$ | $-Z_1/Z_2$ |
| small planetary gears | $Z_3$ | $-Z_1/Z_2$ |
| internal gears | $Z_4$ | $-(Z_1/Z_2) \cdot (Z_3/Z_4)$ |
| output shaft | | 0 |

The internal gear 7 does not rotate actually. Therefore, in order to make the number of its revolution zero (0), the number of revolution of the internal gear 7, i.e. $(Z_1/Z_2) \cdot (Z_3/Z_4)$, is added to the number of revolution of each of the gears described above. Then, the number of revolution $N_1$ of the sun gear (input shaft): $1+(Z_1/Z_2) \cdot (Z_3/Z_4)$ the number of revolution $N_5$ of the output shaft: $(Z_1/Z_2) \cdot (Z_3/Z_4)$ the number of revolution $N_4$ of the internal gears: 0

Therefore, if the change gear ratio R is $R=N_1/N_5$, the change gear ratio R can be calculated as follows:

$$R=N_1/N_5=(Z_2Z_4/Z_1Z_3)+1$$

Figure 3:
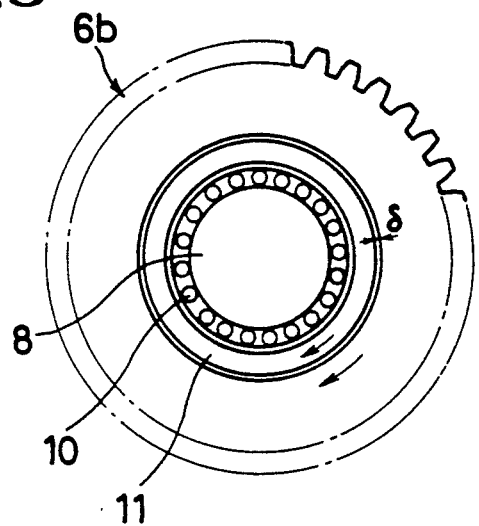
FIG. 3 is a side view showing in detail an intermediate idle constituting a load equally distributing mechanism used for the transmission of the present invention.

In the transmission described above, a plurality of planetary gear members 6 disposed around the sun gears 5 are turnably supported by the planetary shafts 8 through the small planetary gears 6b, and their bearing structure is shown in FIG. 3. This structure is for equalizing mechanism or means equally distributing the load bearing to a plurality of planetary gears 6. As shown in FIG. 3, the intermediate idle ring 11 is turnably fitted on the planetary shaft 8 through the needle idle intermediate and the small planetary gear 6b is turnably supported by the intermediate idle rings 11 through a small gap 6. A small machining error unavoidably occurs during machining by present machining techniques. Therefore, the disposition of such equalizing means in the planetary gear mechanism equipped with a plurality of planetary gear members 6 is important in order to accomplish smooth power transmission.

In the load equally distributing mechanism shown in FIG. 3, the intermediate idle ring 11 co-rotates with the small planetary gear 6b (the planetary gear 6) when the latter rotates, and the gap δ between the small planetary gear 6b and the intermediate idle ring 11 generates a large oil film due to the theory of co-rotation bearing. This oil film adjusts the load acting on the planetary gears 6 and so functions as to equally distribute the load to a plurality of planetary gears 6.

Figure 4:
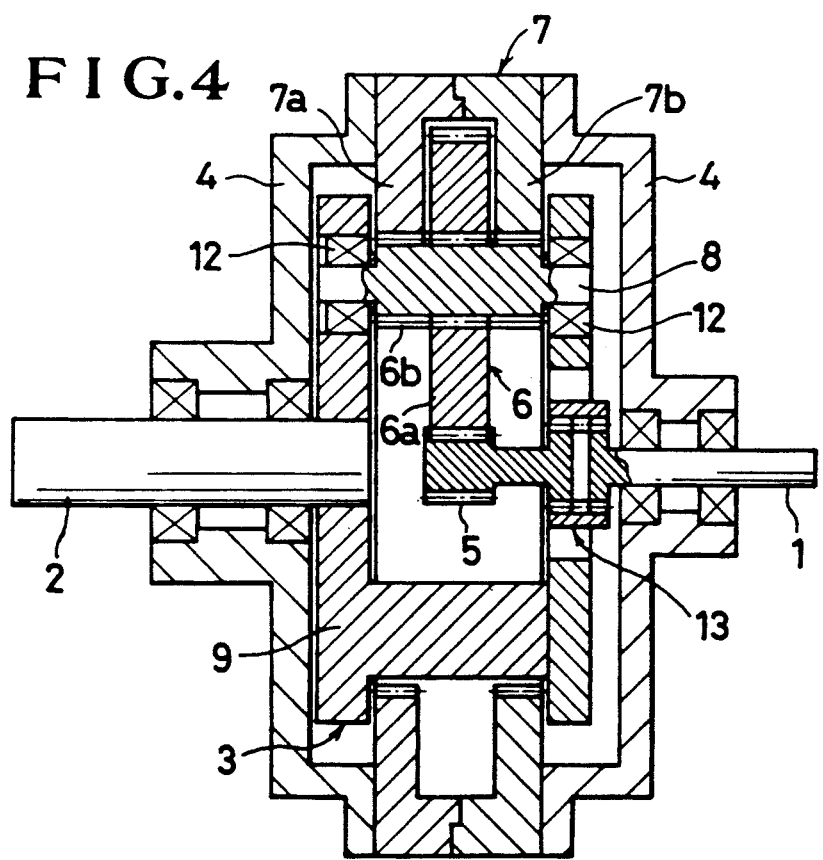
FIG. 4 is a longitudinal sectional view of a planetary gear transmission of another embodiment of the present invention.

FIG. 4 shows another embodiment of the present invention having another type of equalizing mechanism.

This embodiment has substantially the same structure as the embodiment shown in FIGS. 1 and 2 except that only the equalizing means is different. As shown in FIG. 4, the intermediate idle ring gear member is not provided to the planetary gear 6 but the small planetary gear 6b and the planetary shaft 8 have a unitary structure and both end portions of the planetary shaft 8 are supported turnably by the carrier 9 through the bearing 12. Furthermore, a gear coupling 13 is interposed between the input sheet 1 and the sun gear 5. The gear coupling 13 cooperates with the center determining operation of the three planetary gear members 6, so that the equal load corresponding to the function of the intermediate idle ring 11 of the embodiment shown in FIGS. 1 and 2 can be attained.

The embodiment shown in FIG. 4 can be applied to the case where the number of the planetary gear members is limited to three sets (pieces). Moreover, the diameters of these three planetary gear members must be increased in connection with the increase of the change gear ratio, and this embodiment can be used advantageously when the intermediate idle ring 11 cannot be used for this reason.

Though the two embodiments given above are reduction gears, the present invention can also be applied to an over-drive gear. An over-drive gear can be obtained by using the output shaft 2 in the embodiments as an input shaft and the input shaft 1 as the output shaft, and reversing the power transmission route.

In the planetary gear transmission of the present invention described above, each planetary gear member comprises the large planetary gear and the small planetary gears that are spline-coupled to each other, and the large planetary gear is meshed with the sun gear and the small planetary gears, with the internal gear. Accordingly, a high change gear ratio can be obtained by one compact planetary gear mechanism. Since the large planetary gear and the small planetary gears are spline-coupled coaxially and the internal gear comprises the separate internal ring gears divided as two gears, perfect coincidence of the phases of the gear teeth of a plurality of large planetary gears and small planetary gears can be accomplished easily, and power transmission can be made smooth, although the planetary gear mechanism is of a locked train type.

Since the present invention employs the structure wherein the planetary gears each comprise small planetary gears and a large planetary gear spline-coupled to each other and the two ring internal gears mesh with the tooth portions of the small planetary gears on both sides of the large planetary gears while astride the large planetary gear, the provision of an equalizing mechanism such as the intermediate idle ring can be made easily and from this point, too, power transmission can be made smoothly.

What is claimed is:

1. A planetary gear transmission comprising a planetary gear mechanism wherein a plurality of planetary gear members are provided around a sun gear and meshed with said sun gear and an internal gear is provided outside said planetary gear members and meshed with said planetary gear members, wherein:

said internal gear is divided by a plane perpendicular to its axial direction and comprises two separate internal ring gears;

each of said planetary gear members is a compound planetary gear which comprises a large planetary gear having a large diameter and small planetary gears having small diameters, said large diameter being bigger than said small diameter, said small planetary gears being spline-coupled coaxially with said large planetary gear in such a manner that the teeth thereof are positioned on both sides of said large planetary gear;

said divided internal ring gears are meshed with the teeth of each of said small planetary gears;

said large planetary gear is meshed with said sun gear; and said transmission further includes, on each of said plurality of said planetary gear members, an equalizing means for equally distributing a load to the plurality of gears of said gear member.

2. A planetary gear transmission according to claim 1, wherein said equalizing means turnably supports said small planetary gears on planetary shafts through intermediate rings riding on needle bearings on said planetary shafts and allows said small planetary gear to co-rotate while defining a continuous radial gap where an oil film can be formed between said small planetary gears and said intermediate idle ring.

3. A planetary gear transmission according to claim 1, wherein three said planetary gear members are provided; and said equalizing means constitutes said small planetary gears and a planetary shaft in each set of said planetary gears being a unitary structure, said planetary shaft being turnably supported by a carrier, and a gear coupling added to a rotary shaft of said sun gear.

* * * * *